(12) United States Patent
Coccaro et al.

(10) Patent No.: US 8,453,058 B1
(45) Date of Patent: May 28, 2013

(54) CROWD-SOURCED AUDIO SHORTCUTS

(75) Inventors: Noah B. Coccaro, Mountain View, CA (US); Ciprian I. Chelba, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/400,307

(22) Filed: Feb. 20, 2012

(51) Int. Cl.
*G06F 3/16* (2006.01)
*G06F 3/00* (2006.01)
*G06Q 99/00* (2006.01)

(52) U.S. Cl.
USPC ............ 715/727; 715/728; 715/744; 705/319

(58) Field of Classification Search
USPC ........................... 715/727, 728, 744; 705/319
See application file for complete search history.

(56) References Cited

U.S. PATENT DOCUMENTS

| | | |
|---|---|---|
| 6,370,506 B1 | 4/2002 | Ahluwalia |
| 6,766,328 B2 * | 7/2004 | Stefanchik et al. ................... 1/1 |
| 7,321,857 B2 | 1/2008 | Rodriguez et al. |
| 7,421,654 B2 | 9/2008 | Wugoski |
| 7,996,232 B2 | 8/2011 | Rodriguez et al. |
| 8,196,066 B1 * | 6/2012 | Ouyang et al. ................ 715/863 |
| 2002/0010585 A1 | 1/2002 | Gachie et al. |
| 2002/0128837 A1 | 9/2002 | Morin |
| 2004/0176958 A1 * | 9/2004 | Salmenkaita et al. ........ 704/275 |
| 2005/0049862 A1 * | 3/2005 | Choi et al. .................... 704/231 |
| 2005/0114140 A1 | 5/2005 | Brackett et al. |
| 2007/0124149 A1 | 5/2007 | Shen et al. |
| 2008/0086306 A1 | 4/2008 | Hirota et al. |
| 2008/0114604 A1 | 5/2008 | Wei et al. |
| 2008/0129469 A1 | 6/2008 | Sumner et al. |
| 2008/0133244 A1 * | 6/2008 | Bodin et al. ................... 704/275 |
| 2008/0208592 A1 | 8/2008 | Cross et al. |
| 2008/0263024 A1 * | 10/2008 | Landschaft et al. .............. 707/5 |
| 2008/0288891 A1 | 11/2008 | Buth et al. |
| 2010/0088100 A1 | 4/2010 | Lindahl |
| 2010/0250336 A1 * | 9/2010 | Selinger et al. ................. 705/10 |
| 2011/0131172 A1 * | 6/2011 | Herzog et al. .................. 706/58 |
| 2011/0143768 A1 | 6/2011 | Lane et al. |
| 2012/0004954 A1 * | 1/2012 | Eisinger et al. .............. 705/14.1 |
| 2012/0011021 A1 * | 1/2012 | Wang et al. ................... 705/26.5 |
| 2012/0136887 A1 * | 5/2012 | Cha et al. ....................... 707/767 |

OTHER PUBLICATIONS

Tom Ouyang and Yang Li. 2012. Bootstrapping personal gesture shortcuts with the wisdom of the crowd and handwriting recognition. In Proceedings of the 2012 ACM annual conference on Human Factors in Computing Systems (CHI '12). ACM, New York, NY, USA, 2895-2904.*

(Continued)

*Primary Examiner* — William Bashore
*Assistant Examiner* — Andrea Long
(74) *Attorney, Agent, or Firm* — McDonnell Boehnen Hulbert & Berghoff LLP

(57) ABSTRACT

An audio shortcut may involve an audio command being used to represent a sequence of one or more inputs on a client device. When the client device receives the audio command, the client device may automatically perform the sequence of one or more inputs, as if this sequence were entered manually. If a threshold number of client devices share the same or a similar audio shortcut with a server device, the server device may make this audio shortcut available to additional client devices.

20 Claims, 8 Drawing Sheets

OTHER PUBLICATIONS

Florian Alt, Alireza Sahami Shirazi, Albrecht Schmidt, Urs Kramer, and Zahid Nawaz. 2010. Location-based crowdsourcing: extending crowdsourcing to the real world. In Proceedings of the 6th Nordic Conference on Human-Computer Interaction: Extending Boundaries (NordiCHI '10). ACM, New York, NY, USA, 13-22.*

Bourdot et al., "Management of non-standard devices for multimodal user interfaces under UNIX/X11," pp. 1-11 (1995) Retrieved from the Internet: http://citeseerx.ist.psu.edu/viewdoc/download?doi=10.1.1.44.7126&rep1&type=pdf.

Yang, Yin-Pin, "An Innovative Distributed Speech Recognition Platform for Portable, Personalized and Humanized Wireless Devices," Computational Linguistics and Chinese Language Processing, 9(2):77-94 (Aug. 2004) retrieved from the internet: http://aclweb.org/anthology/O/O04/O04-3006.pdf.

Velazco, Chris, "Android Voice Actions Now Play Well With Accents, EU Languages," (Sep. 16, 2011) retrieved from the internet: http://techcrunch.com/2011/09/16/android-voice-actions-now-plays-well-with-accents-eu-languages/, 1 page.

Rawson, Chris, "iOS 5's final release may include "Assistant" speech-to-text feature," (Jul. 23, 2011) retrieved from internet: http://www.tuaw.com/2011/07/23/ios-5s-final-release-may-include-assistant-speech-to-text-fea/, 4 pages.

Bookwalter, J.R., "Nuance Delivers iOS Voice Command with Dragon Go! App," (Jul. 14, 2011) retrieved from internet: http://www.maclife.com/article/news/nuance_delivers_ios_voice_command_dragon_go_app, 1 page.

Rose, Brent, "Apple Predicted Siri 24 Years Ago So Perfectly It's Scary," Gizmodo.com (Oct. 4, 2011) retrieved from http://gizmodo.com/5846630/apple-predicted-siri-24-years-ago-so-perfectly-its-scary, 1 page.

* cited by examiner

CROWD-SOURCED AUDIO SHORTCUTS

BACKGROUND

It is often desirable for a client device (e.g., a cell phone) to support one or more types of "hands-free" operations. For example, when the user of such a client device is driving a car, it can be dangerous (and, in some jurisdictions, illegal) for the user to operate certain aspects of the client device's user interface. Particularly, entering sequences of keypresses, or other types of input entry, can be distracting to a driver. Consequently, some client devices use audio commands as replacements for manual input.

SUMMARY

In an example embodiment, a server device may receive a representation of an association between an audio command and a client device function. After receiving the representation of the association, the server device may determine that the server device has received a threshold number of representations of the association between the audio command and the client device function. After determining that the server device has received the threshold number of representations of the association between the audio command and the client device function, the server device may transmit a second representation of the association to a destination client device, wherein the association causes the destination client device to perform the client device function in response to the destination client device receiving the audio command.

In another example embodiment, a server device may receive, from an originating client device, an audio command and a client device function. In response to receiving the audio command and the client device function, the server device may form an association between the audio command and the client device function. After forming the association, the server device may (i) store the association, (ii) transmit a representation of the association to the originating client device, wherein the association may cause the originating client device to perform the client device function in response to the originating client device receiving the audio command, and (iii) transmit the representation of the association to a destination client device, wherein the association may cause the destination client device to perform the client device function in response to the destination client device receiving the audio command.

In yet another example embodiment, a server device may comprise a processor, data storage, and a communication interface. The data storage may contain at least part of an association database that includes representations of associations between audio commands and client device functions. The communication interface may be capable of communicating with a plurality of client devices. The server device may receive, from a first client device in the plurality, a first representation of an association between a given audio command and a given client device function. In response to receiving the first representation of the association, the server device may update the association database to incorporate the first representation of the association. The server device may also receive, from a second client device in the plurality, a second representation of the association between the given audio command and the given client device function. In response to receiving the second representation of the association, the server device may update the association database to incorporate the second representation of the association. Based on content of the association database, server device may determine that the server device has received a threshold number of representations of the association between the given audio command and the given client device function. Then, the server device may transmit, to one or more client devices in the plurality, a third representation of the association between the given audio command and the given client device function.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
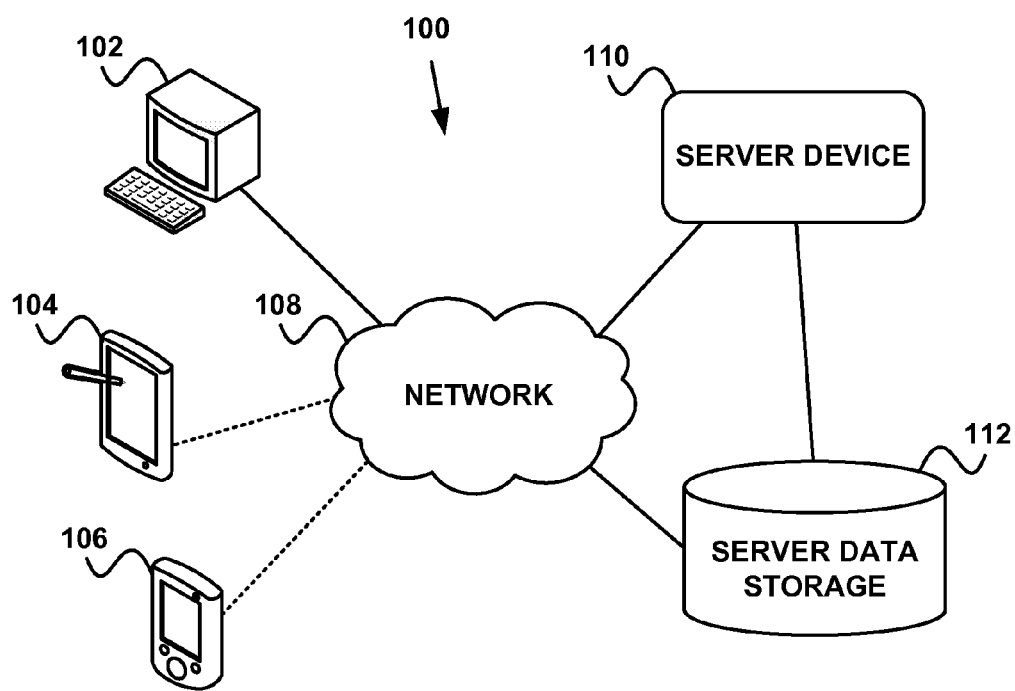
FIG. 1 is a simplified block diagram of a system, in accordance with one or more example embodiments.

Disclosed herein are methods, devices, and systems for crowd-sourced audio shortcuts. In at least one possible embodiment, an audio shortcut involves an audio command being used to represent a sequence of one or more inputs on a client device. This representation may be referred to as an association between the audio command and the sequence of one or more inputs.

When the client device receives the audio command, e.g., via the user interface of the client device, the client device may automatically perform the sequence of inputs, as if this sequence were entered manually. Alternatively, the audio shortcut may involve the audio command being used to represent one or more state changes in the client device. In this case, when the client device receives the audio command, the client device may automatically change its state accordingly. Regardless, if a threshold number of client devices share the same or a similar audio shortcut with a server device, the server device may make this audio shortcut available for download to additional client devices.

The client device could be a mobile device, such as a cell phone or tablet computer. However, in full generality, the client device can be any type of computing device with a user interface for receiving input. The audio command can be a voice command, musical command, or any other type of audio signal. The sequence of input can be one or more keypresses, mouse actions, and/or touchscreen gestures (e.g., pokes, swipes, and/or pinches).

As an illustrative, non-limiting example of an audio shortcut, a user may associate the voice command "turn on Wifi" with a sequence of keypresses that activate the Wifi radio function on the user's client device. In another illustrative, non-limiting example, the user may associate the voice command "get weather" with a sequence of touchscreen gestures that result in a weather application installed on the user's client device displaying and/or audibly playing out a current weather report for the user's location. Alternatively, the voice command "turn on Wifi" could be associated with changing the state of the client device's Wifi radio function to "on", and the voice command "get weather" could be associated with changing the state of the client device's weather application so that the current weather report is displayed or played out.

In yet another illustrative, non-limiting example, the user may associate a parameterized voice command with a parameterized input sequence. For instance, the user may associate the voice command "play X" (where X is a parameter) with an input sequence that activates a media player on the user's client device, and instructs the media player to play out the media entitled with or otherwise represented by the parameter X. Thus, this audio shortcut may allow the user to speak the voice command "play White Christmas," and the media player may play out the song White Christmas. This playout may involve playing a local copy of White Christmas, or streaming a copy of White Christmas from a remote server.

Regardless of the audio shortcuts that a given user establishes, these associations are typically only effective for the given user. Thus, even if the given user creates an audio shortcut that is potentially useful to a wide range of other users, these other users will not have access to the shortcut.

To overcome this limitation, client devices can transmit a representation of a user-defined audio shortcut, in the form of the audio command and an associated input sequence, to a server device. Then, other users can download this audio shortcut from the server device, or the server device can transmit (e.g., push) the audio shortcut to the other users.

However, with the potential for thousands, if not millions, of audio shortcuts to exist, it may be difficult for users to decide which audio shortcuts to download and/or use. Therefore, the server device may track the number of users that have defined the same audio shortcut. (Two or more users may define the same audio shortcut when they associate the same audio command with the same input sequence.) Once a threshold number of users have defined the same audio shortcut, a reasonable conclusion is that the audio shortcut is "popular" and that other users will be also interested in downloading and/or using the audio shortcut. Therefore, the server device may make the audio shortcut available to other users, perhaps as a download or through automatic provisioning. Alternatively or additionally, the audio shortcut may become a default feature of some or all client devices. This "crowdsourcing" of audio shortcuts may improve the number of useful audio shortcuts available to users at large.

1. Communication System and Device Architecture

The methods, devices, and systems described herein can be implemented using various types of client devices and possibly "cloud-based" server devices. Under aspects of this paradigm, client devices, such as mobile phones and tablet computers, may offload some processing and storage responsibilities to remote server devices. At least some of the time, these client services are able to communicate, via a network such as the Internet, with the server devices. As a result, applications that operate on the client devices may also have a persistent, server-based component.

The "server devices" described herein may not necessarily be associated with a client/server architecture, and therefore may be interchangeably referred to as "computing devices." Similarly, the "client devices" described herein also may not necessarily be associated with a client/server architecture, and therefore may be interchangeably referred to as "user devices."

This section describes general system and device architectures for such client devices and server devices. However, the methods, devices, and systems presented in the following sections may operate under different paradigms as well. Thus, the embodiments of this section are merely examples of how these methods, devices, and systems can be enabled.

A. Communication System

FIG. 1 is a simplified block diagram of a communication system 100, in which various embodiments described herein can be employed. Communication system 100 includes client devices 102, 104, and 106, which represent a desktop personal computer (PC), a tablet computer, and a mobile phone, respectively. Each of these client devices may be able to communicate with other devices via a network 108 through the use of wireline connections (designated by solid lines) and/or wireless connections (designated by dashed lines).

Network 108 may be, for example, the Internet, or some form of public or private Internet Protocol (IP) network. Thus, client devices 102, 104, and 106 may communicate using packet-switching technologies. Nonetheless, network 108 may also incorporate at least some circuit-switching technologies, and client devices 102, 104, and 106 may communicate via circuit switching alternatively or in addition to packet switching.

A server device 110 may also communicate via network 108. Particularly, server device 110 may communicate with client devices 102, 104, and 106 according to one or more network protocols and/or application-level protocols to facilitate the use of network-based or cloud-based computing on these client devices. Server device 110 may include integrated data storage (e.g., memory, disk drives, etc.) and may also be able to access a separate server data storage 112. Communication between server device 110 and server data storage 112 may be direct, via network 108, or both direct and via network 108 as illustrated in FIG. 1. Server data storage 112 may store application data that is used to facilitate the operations of applications performed by client devices 102, 104, and 106 and server device 110.

Although only three client devices, one server device, and one server data storage are shown in FIG. 1, communication system 100 may include more of each of these components. For instance, communication system 100 may comprise millions of client devices, thousands of server devices and/or thousands of server data storages. Furthermore, client devices may take on forms other than those in FIG. 1.

B. Server Device

Figure 2A:
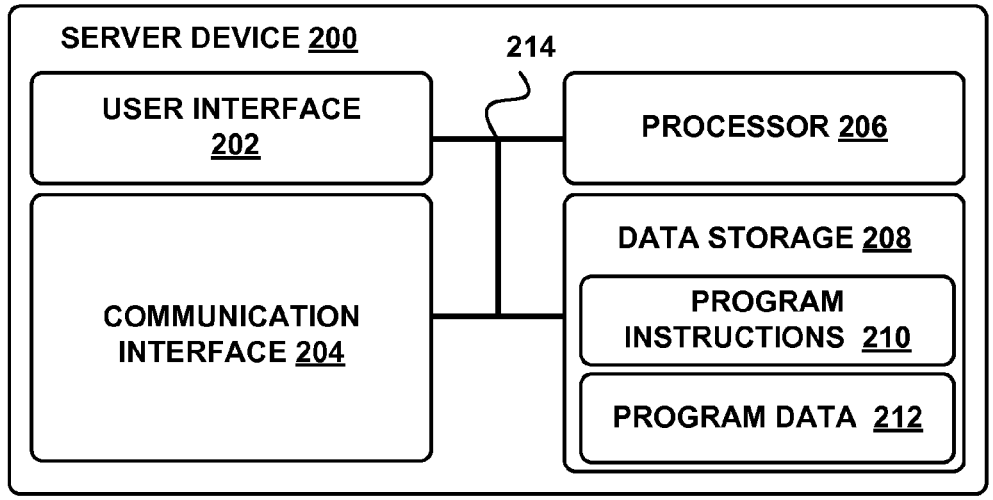
FIG. 2A is a simplified block diagram of a server device, in accordance with one or more example embodiments.

FIG. 2A is a block diagram of a server device in accordance with an example embodiment. In particular, a server device 200 shown in FIG. 2A can be configured to perform one or more functions of server device 110 and/or server data storage 112. Server device 200 may include a user interface 202, a communication interface 204, processor 206, and data storage 208, all of which may be linked together via a system bus, network, or other connection mechanism 214.

User interface 202 may comprise user input devices such as a keyboard, a keypad, a touch screen, a computer mouse, a track ball, a joystick, and/or other similar devices, now known or later developed. User interface 202 may also comprise user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. Additionally, user interface 202 may be configured to generate audible output(s), via a speaker, speaker jack, audio output port, audio output device, earphones, and/or other similar devices, now known or later developed. In some embodiments, user interface 202 may include software, circuitry, or another form of logic that can transmit data to and/or receive data from external user input/output devices.

Communication interface 204 may include one or more wireless interfaces and/or wireline interfaces that are configurable to communicate via a network, such as network 108 shown in FIG. 1. The wireless interfaces, if present, may include one or more wireless transceivers, such as a BLUETOOTH® transceiver, a Wifi transceiver perhaps operating in accordance with an IEEE 802.11 standard (e.g., 802.11a, 8020.11b, 802.11g), a WiMAX transceiver perhaps operating in accordance with an IEEE 802.16 standard, a Long-Term Evolution (LTE) transceiver perhaps operating in accordance with a 3rd Generation Partnership Project (3GPP) standard, and/or other types of wireless transceivers configurable to communicate via local-area or wide-area wireless networks. The wireline interfaces, if present, may include one or more wireline transceivers, such as an Ethernet transceiver, a Universal Serial Bus (USB) transceiver, or similar transceiver configurable to communicate via a twisted pair wire, a coaxial cable, a fiber-optic link or other physical connection to a wireline device or network.

In some embodiments, communication interface 204 may be configured to provide reliable, secured, and/or authenticated communications. For each communication described herein, information for ensuring reliable communications (e.g., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, the data encryption standard (DES), the advanced encryption standard (AES), the Rivest, Shamir, and Adleman (RSA) algorithm, the Diffie-Hellman algorithm, and/or the Digital Signature Algorithm (DSA). Other cryptographic protocols and/or algorithms may be used instead of or in addition to those listed herein to secure (and then decrypt/decode) communications.

Processor 206 may include one or more general purpose processors (e.g., microprocessors) and/or one or more special purpose processors (e.g., digital signal processors (DSPs), graphical processing units (GPUs), floating point processing units (FPUs), network processors, or application specific integrated circuits (ASICs)). Processor 206 may be configured to execute computer-readable program instructions 210 that are contained in data storage 208, and/or other instructions, to carry out various functions described herein.

Data storage 208 may include one or more non-transitory computer-readable storage media that can be read or accessed by processor 206. The one or more computer-readable storage media may include volatile and/or non-volatile storage components, such as optical, magnetic, organic or other memory or disc storage, which can be integrated in whole or in part with processor 206. In some embodiments, data storage 208 may be implemented using a single physical device (e.g., one optical, magnetic, organic or other memory or disc storage unit), while in other embodiments, data storage 208 may be implemented using two or more physical devices.

Data storage 208 may also include program data 212 that can be used by processor 206 to carry out functions described herein. In some embodiments, data storage 208 may include, or have access to, additional data storage components or devices (e.g., cluster data storages described below).

C. Server Clusters

Server device 110 and server data storage device 112 may store applications and application data at one or more places accessible via network 108. These places may be data centers containing numerous servers and storage devices. The exact physical location, connectivity, and configuration of server device 110 and server data storage device 112 may be unknown and/or unimportant to client devices. Accordingly, server device 110 and server data storage device 112 may be referred to as "cloud-based" devices that are housed at various remote locations. One possible advantage of such "could-based" computing is to offload the processing and data storage from client devices, thereby simplifying the design and requirements of these client devices.

In some embodiments, server device 110 and server data storage device 112 may be a single computing device residing in a single data center. In other embodiments, server device 110 and server data storage device 112 may include multiple computing devices in a data center, or even multiple computing devices in multiple data centers, where the data centers are located in diverse geographic locations. For example, FIG. 1 depicts each of server device 110 and server data storage device 112 potentially residing in a different physical location.

Figure 2B:
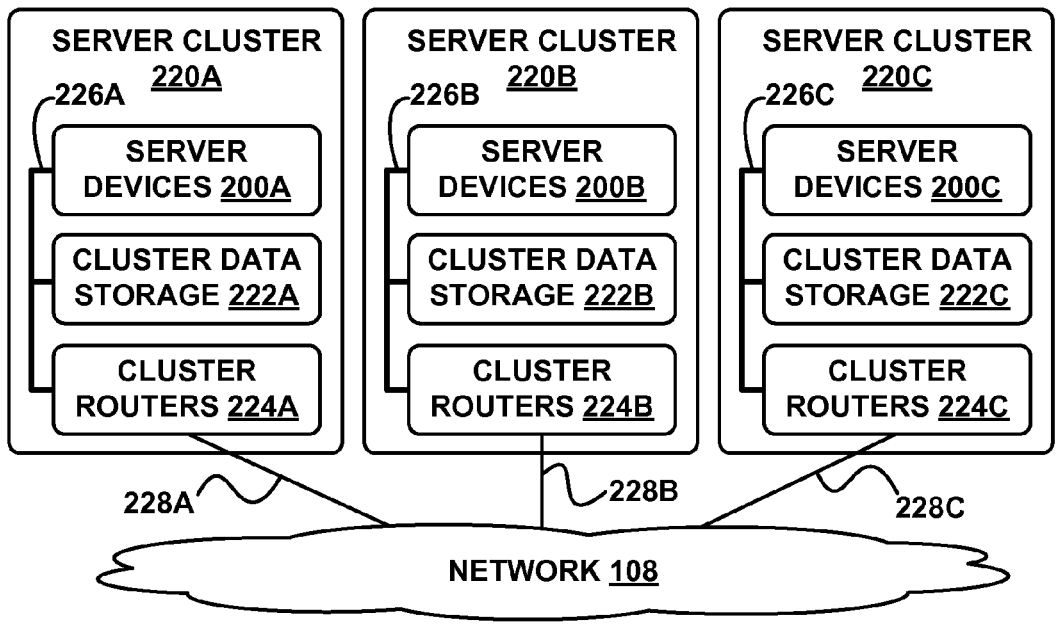
FIG. 2B is a simplified block diagram of server clusters, in accordance with one or more example embodiments.

FIG. 2B depicts a cloud-based server cluster in accordance with an example embodiment. In FIG. 2B, functions of server device 110 and server data storage device 112 may be distributed among three server clusters 220a, 220b, and 220c. Server cluster 220a may include one or more server devices 200a, cluster data storage 222a, and cluster routers 224a connected by a local cluster network 226a. Similarly, server cluster 220b may include one or more server devices 200b, cluster data storage 222b, and cluster routers 224b connected by a local cluster network 226b. Likewise, server cluster 220c may include one or more server devices 200c, cluster data storage 222c, and cluster routers 224c connected by a local cluster network 226c. Server clusters 220a, 220b, and 220c may communicate with network 108 via communication links 228a, 228b, and 228c, respectively.

In some embodiments, each of the server clusters 220a, 220b, and 220c may have an equal number of server devices, an equal number of cluster data storages, and an equal number of cluster routers. In other embodiments, however, some or all of the server clusters 220a, 220b, and 220c may have different numbers of server devices, different numbers of cluster data storages, and/or different numbers of cluster routers. The number of server devices, cluster data storages, and cluster routers in each server cluster may depend on the computing task(s) and/or applications assigned to each server cluster.

In the server cluster 220a, for example, server devices 200a can be configured to perform various computing tasks of server device 110. In one embodiment, these computing tasks can be distributed among one or more of server devices 200a. Server devices 200b and 200c in server clusters 220b and 220c may be configured the same or similarly to server devices 200a in server cluster 220a. On the other hand, in some embodiments, server devices 200a, 200b, and 200c each may be configured to perform different functions. For example, server devices 200a may be configured to perform one or more functions of server device 110, and server devices 200*b* and server device 200*c* may be configured to perform functions of one or more other server devices. Similarly, the functions of server data storage device 112 can be dedicated to a single server cluster, or spread across multiple server clusters.

Cluster data storages 222*a*, 222*b*, and 222*c* of the server clusters 220*a*, 220*b*, and 220*c*, respectively, may be data storage arrays that include disk array controllers configured to manage read and write access to groups of hard disk drives. The disk array controllers, alone or in conjunction with their respective server devices, may also be configured to manage backup or redundant copies of the data stored in cluster data storages to protect against disk drive or types of failures that prevent one or more server devices from accessing one or more cluster data storages.

Similar to the manner in which the functions of server device 110 and server data storage device 112 can be distributed across server clusters 220*a*, 220*b*, and 220*c*, various active portions and/or backup/redundant portions of these components can be distributed across cluster data storages 222*a*, 222*b*, and 222*c*. For example, some cluster data storages 222*a*, 222*b*, and 222*c* may be configured to store backup versions of data stored in other cluster data storages 222*a*, 222*b*, and 222*c*.

Cluster routers 224*a*, 224*b*, and 224*c* in server clusters 220*a*, 220*b*, and 220*c*, respectively, may include networking equipment configured to provide internal and external communications for the server clusters. For example, cluster routers 224*a* in server cluster 220*a* may include one or more packet-switching and/or routing devices configured to provide (i) network communications between server devices 200*a* and cluster data storage 222*a* via cluster network 226*a*, and/or (ii) network communications between the server cluster 220*a* and other devices via communication link 228*a* to network 108. Cluster routers 224*b* and 224*c* may include network equipment similar to cluster routers 224*a*, and cluster routers 224*b* and 224*c* may perform networking functions for server clusters 220*b* and 220*c* that cluster routers 224*a* perform for server cluster 220*a*.

Additionally, the configuration of cluster routers 224*a*, 224*b*, and 224*c* can be based at least in part on the data communication requirements of the server devices and cluster storage arrays, the data communications capabilities of the network equipment in the cluster routers 224*a*, 224*b*, and 224*c*, the latency and throughput of the local cluster networks 226*a*, 226*b*, 226*c*, the latency, throughput, and cost of the wide area network connections 228*a*, 228*b*, and 228*c*, and/or other factors that may contribute to the cost, speed, fault-tolerance, resiliency, efficiency and/or other design goals of the system architecture.

D. Client Device

Figure 3A:
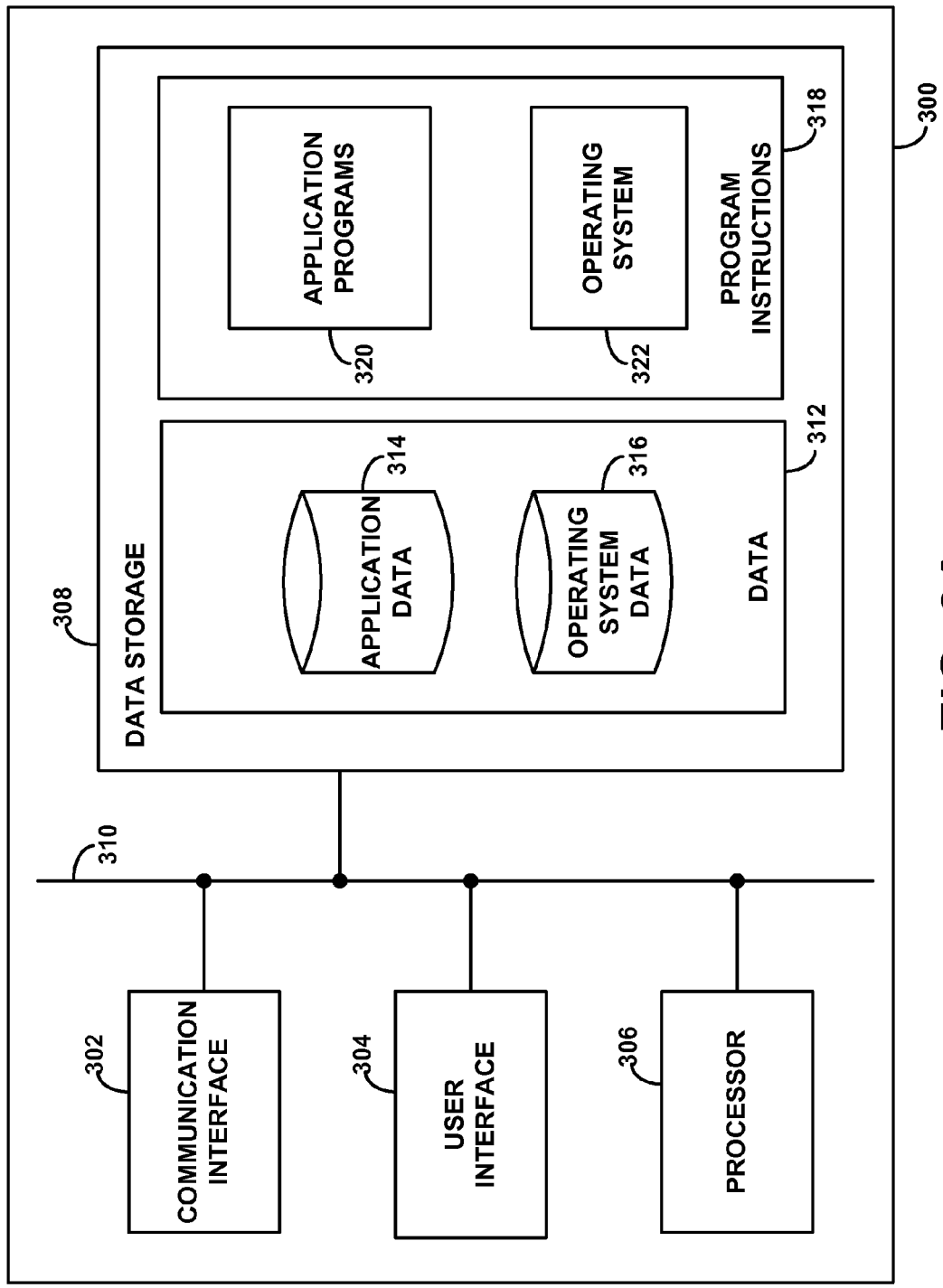
FIG. 3A is a simplified block diagram of a client device, in accordance with one or more example embodiments.

FIG. 3A is a simplified block diagram showing some of the components of an example client device 300. By way of example and without limitation, client device 300 may be a "plain old telephone system" (POTS) telephone, a cellular mobile telephone, a fax machine, an answering machine, a computer (such as a desktop, notebook, or tablet computer), a personal digital assistant (PDA), a digital video recorder (DVR), a digital TV, a remote control, one or more components of a home automation system, or some other type of device equipped with one or more wireless or wired communication interfaces.

As shown in FIG. 3A, client device 300 may include a communication interface 302, a user interface 304, a processor 306, and data storage 308, all of which may be communicatively linked together by a system bus, network, or other connection mechanism 310.

Communication interface 302 functions to allow client device 300 to communicate, using analog or digital modulation, with other devices, access networks, and/or transport networks. Thus, communication interface 302 may facilitate circuit-switched and/or packet-switched communication, such as POTS communication and/or IP or other packetized communication. For instance, communication interface 302 may include a chipset and antenna arranged for wireless communication with a radio access network or an access point. Also, communication interface 302 may take the form of a wireline interface, such as an Ethernet, Token Ring, or USB port. Communication interface 302 may also take the form of a wireless interface, such as Wifi, BLUETOOTH®, global positioning system (GPS), or a wide-area wireless interface (e.g., WiMAX or LTE). However, other forms of physical layer interfaces and other types of standard or proprietary communication protocols may be used over communication interface 302. Furthermore, communication interface 302 may comprise multiple physical communication interfaces (e.g., a Wifi interface, a BLUETOOTH® interface, and a wide-area wireless interface).

User interface 304 may function to allow client device 300 to interact with a human or non-human user, such as to receive input from a user and to provide output to the user. Thus, user interface 304 may include input components such as a keypad or keyboard, touch-sensitive or presence-sensitive panel, computer mouse, trackball, joystick, microphone, still camera and/or video camera. User interface 304 may also include one or more output components such as a display screen (which, for example, may be combined with a touch-sensitive panel), CRT, LCD, LED, a display using DLP technology, printer, light bulb, and/or other similar devices, now known or later developed. User interface 304 may also be configured to generate audible output(s), via a speaker, speaker jack, audio output port, audio output device, earphones, and/or other similar devices, now known or later developed. In some embodiments, user interface 304 may include software, circuitry, or another form of logic that can transmit data to and/or receive data from external user input/output devices. Additionally or alternatively, client device 300 may support remote access from another device, via communication interface 302 or via another physical interface (not shown.

Processor 306 may comprise one or more general purpose processors (e.g., microprocessors) and/or one or more special purpose processors (e.g., DSPs, GPUs, FPUs, network processors, or ASICs). Data storage 308 may include one or more volatile and/or non-volatile storage components, such as magnetic, optical, flash, or organic storage, and may be integrated in whole or in part with processor 306. Data storage 308 may include removable and/or non-removable components.

Generally speaking, processor 306 may be capable of executing program instructions 318 (e.g., compiled or non-compiled program logic and/or machine code) stored in data storage 308 to carry out the various functions described herein. Therefore, data storage 308 may include a non-transitory computer-readable medium, having stored thereon program instructions that, if executed by client device 300, cause client device 300 to carry out any of the methods, processes, or functions disclosed in this specification and/or the accompanying drawings. The execution of program instructions 318 by processor 306 may result in processor 306 using data 312.

By way of example, program instructions 318 may include an operating system 322 (e.g., an operating system kernel, device driver(s), and/or other modules) and one or more application programs 320 (e.g., address book, email, web browsing, social networking, and/or gaming applications)

installed on client device 300. Similarly, data 312 may include operating system data 316 and application data 314. Operating system data 316 may be accessible primarily to operating system 322, and application data 314 may be accessible primarily to one or more of application programs 320. Application data 314 may be arranged in a file system that is visible or hidden to a user of client device 300.

Application programs 320 may communicate with operating system 312 through one or more application programming interfaces (APIs). These APIs may facilitate, for instance, application programs 320 reading and/or writing application data 314, transmitting or receiving information via communication interface 302, receiving or displaying information on user interface 304, and so on.

In some vernaculars, application programs 320 may be referred to as "apps" for short. Additionally, application programs 320 may be downloadable to client device 300 through one or more online application stores or application markets. However, application programs can also be installed on client device 300 in other ways, such as via a web browser or through a physical interface (e.g., a USB port) on client device 300.

2. Audio Shortcuts

For purposes of this description, an audio shortcut can be any association between an audio command and a client device function. When an audio shortcut is registered on a client device, the client device is arranged (e.g., programmed) so that the client device can perform the client device function in response to receiving the audio command via the client device's user interface.

A. Audio Commands

An audio command may be any type of sound signal that can be used to control the behavior of a client device. For instance, an audio command may be a human voice speaking words (i.e., human speech), an animal sound, music, a synthesized combination of frequencies, and so on. An audio command could even comprise frequencies that are inaudible to humans (e.g., frequencies above about 20,000 Hz).

Audio commands may be recorded and stored in accordance with one or more audio file format types, such as a WAV file or an MP3 file. However, any type of audio file format could be used. Alternatively or additionally, if the audio command comprises spoken words, these words may be transcribed to text via any appropriate form of voice recognition technology. Thus, an audio command may be able to be stored as the recognized text, or some other representation of the recognized text.

B. Client Device Functions

A client device function may be any function capable of being performed by a client device. Example client device functions include activating and/or deactivating a communication interface on the client device, downloading and/or uploading a file, beginning execution and/or terminating execution of an application, playing back a media file, streaming media from a network, and using a feature or capability of any application installed on the client device. In some cases, a client device function can be represented as a sequence of one or more inputs, such as one or more keypresses, mouse actions, and/or touchscreen gestures (e.g., pokes, swipes, and/or pinches). It may be possible to categorize some audio shortcuts as macros, in that potentially long and time-consuming sequences of keystrokes, mouse actions, and/or touchscreen gestures can be shortened into, and/or represented by, an audio command.

For example, activating and/or deactivating a Wifi interface on a client device might involve navigating through one or more menus or screens to select a "settings" option, navigating the settings menu or screen to select a "wireless" option, and navigating the wireless menu or screen to select an "activate Wifi" option. The sequence of keypresses, movements, and/or gestures that result in the Wifi interface being activated can be used to represent this client device function.

Similarly, refreshing the inbox of an email account on a client device might involve navigating through one or more menus or screens to select the email application, and navigating the menus or screens of the email application to select a "refresh" option for the inbox of the email account. The sequence of keypresses, movements, and/or gestures that result in the inbox of the email account being refreshed can be used to represent this client device function.

These sequences of inputs may be defined and encoded in various ways. For example, they may be encoded as an array of keypress values (e.g., "left," "1," "up," "2," "ok"), an array of mouse actions (e.g., "click file," "click open," "select song.mp3"), or an array of touchscreen gestures (e.g., "swipe left from screen position 160×240," "tap at screen position 80×240", etc.). It should be understood that these example keypresses, mouse actions, and touchscreen gestures are presented for purpose of illustration. Additional keypresses, mouse actions, and/or touchscreen gestures can be used with the embodiments herein. Furthermore, the encodings of these client device functions may be different than those noted above. For example, client device functions can be encoded in a binary format.

Since the user interface state of a client device may vary based on the most recent set of input from the user, it may be helpful for a client device function defined in this manner to operate from a fixed point of reference in the client device's user interface, such as a home screen. For example, suppose that the user of a client device instructs the client device to begin executing a social networking application such that the social networking application's user interface is displayed on the screen of the client device. If the user leaves the social networking application executing in this state, performing a sequence of inputs that make up a client device function may take place relative to this state. As a result, the sequence of inputs might result in a different outcome than the user intended.

Instead, the client device may perform some or all defined client device functions from a home screen, or some other pre-established user interface context, of the client device's user interface. Therefore, regardless of the current user interface state of the client device, a defined client device function can always have the same effect on the client device.

It should be understood that a client device function can be represented in ways other than as a sequence of one or more inputs. For example, a client device function can be represented as a sequence of one or more state changes on a client device. Alternatively, each client device function may be assigned a unique identifier, and a given client device function can be represented with a reference to its unique identifier. Client device functions may be able to be defined in other ways as well, or by using some combination of the methods described herein.

C. Associating Audio Commands and Client Device Functions

Once an audio command and a client device function are defined (e.g., by the user of a client device), they can be associated with one another to form an audio shortcut. This association may occur on the client device or on a server device with which the client device communicates. In some embodiments, the association may occur at the request of a user, and/or as a result of communication between the client device and the server device.

For example, the client device may present a user with an option to define an audio shortcut. One possible method that the client device might employ for doing so is to place the client device in an "audio shortcut definition mode." In this mode, the client device might prompt the user to record an audio command via a microphone or another input interface. Then, the client device might prompt the user to enter the client device function. To do so, the client device might prompt the user to manually perform the client device function.

Thus, when prompted to enter the audio command, the user may speak the phrase "turn on Wifi." In turn, when prompted to perform the client device function, the user might navigate from the client device's home screen through one or more menus or screens to select a "settings" option, navigate the settings menu or screen to select a "wireless" option, and navigating the wireless menu or screen to select an "activate Wifi" option. The user might indicate that he or she has completed performing the client device function by pressing a special key (e.g., an "end" key) or entering a special code into the client device. Once the user has performed the sequence of inputs that represent the client device function, the client device may associate the audio command with the client device function to form an audio shortcut. The audio shortcut may then be registered with the client device.

Generally speaking, an audio shortcut may be stored as a tuple that associates the audio command to the client device function. The tuple may be stored in, for example, a file, a directory structure, a list entry, an array entry and/or a database entry. As noted above, the audio command and the client device function may each be encoded in various formats, and any of these formats may be used to create and/or store the association.

For example, in one representation of an audio shortcut, the audio command may be a sound file, while the client device function might be a binary representation of one or more client device inputs. In another representation of an audio shortcut, the audio command may be a text string, while the client device function may be the same binary representation of one or more client device inputs. In the latter case, the client device may have performed voice recognition on an audio command received from its user, and, perhaps to conserve storage and network utilization, included the recognized text instead of the audio file in the representation of the audio shortcut.

Alternatively, the client device may transmit both the recognized text and the audio file to the server device so that the server device can perform its own voice recognition on the audio file. Due to the server device potentially having more processing power and memory, the server device may be able to perform more accurate voice recognition than the client device.

Figure 3B:
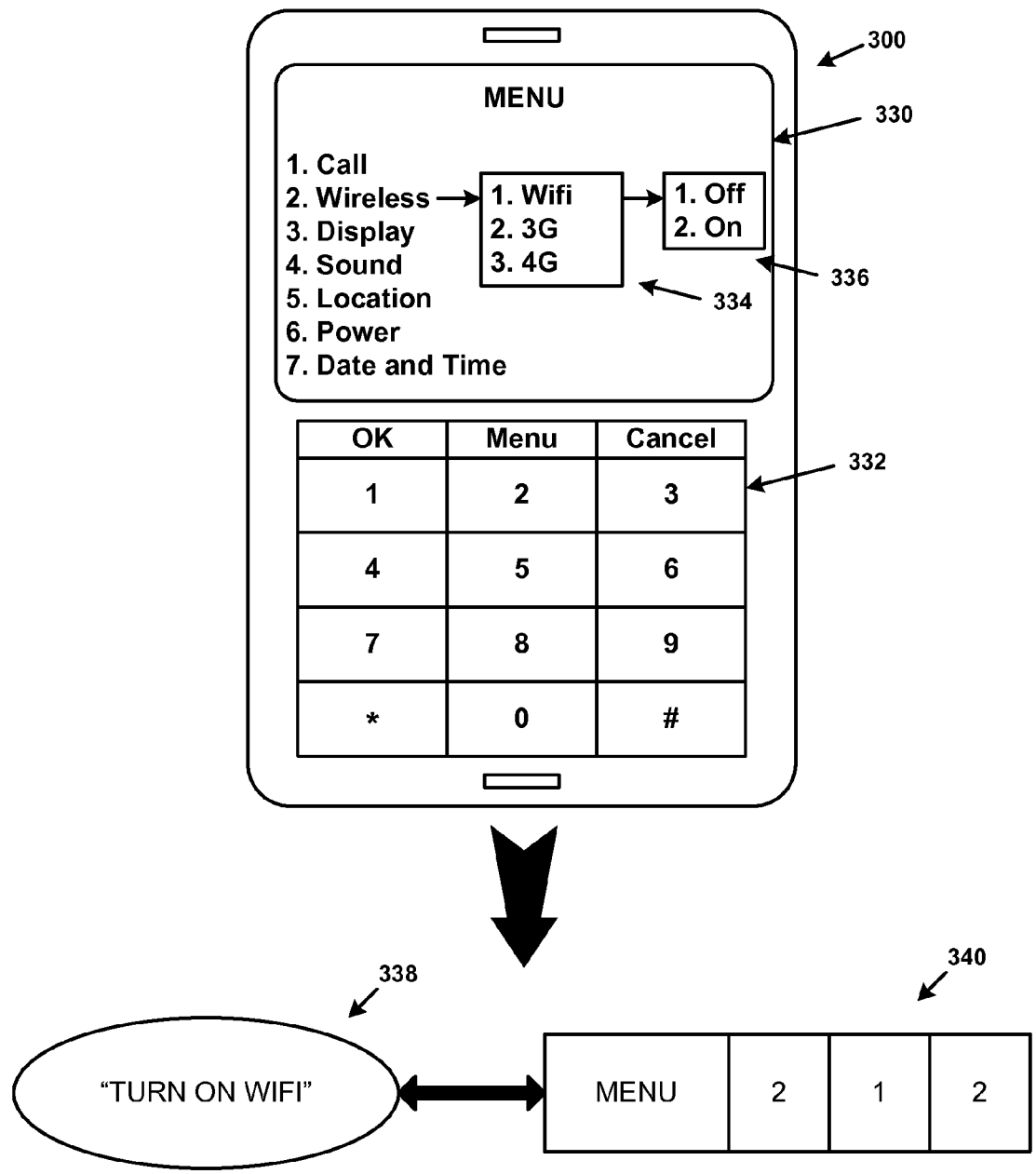
FIG. 3B is a simplified diagram of a client device user interface, in accordance with one or more example embodiments.

FIG. 3B depicts an example client device 300 with which an association between an audio command and a client device function can be made. Client device 300 includes a user interface that comprises a display screen 330 and a keypad 332. On client device 300, pressing the "menu" key on keypad 332 may result in client device 300 displaying a menu, such as the menu shown on display screen 330. Then, if the "2" key on keypad 332 is pressed, a wireless menu 334 may be displayed. From wireless menu 334, if the "1" key on keypad 332 is pressed, a Wifi menu 336 may be displayed. From Wifi menu 336, the Wifi radio of client device 300 can either be turned off by pressing the "1" key on keypad 332, or turned on by pressing the "2" key on keypad 332. Thus, the audio command "turn on Wifi" can be associated with the client device function defined by the keypress sequence "menu", "2", "1", "2". In FIG. 3B this association is illustrated by the logical link between audio command 338 and client device function 340.

D. Parameterized Audio Shortcuts

Additionally, some audio shortcuts may be parameterized. For example, the voice command "call X" (where X is, e.g., a name) may be associated with a client device function that (i) opens a phone application on the client device, (ii) instructs the phone application to look up X in a contact list, and (iii) places an outgoing call to the phone number of X. Thus, if the client device receives the voice command "call Alice," the client device may place an outgoing call to Alice's phone number.

Similarly, the voice command "text Y to X" (where X is, e.g., a name of a contact and Y is, e.g., a short message) may be associated with a client device function that (i) opens a text messaging application on the client device, (ii) instructs the text messaging application to look up contact X in a contact list, and (iii) transmits an outgoing text message containing the message Y to the phone number of contact X. Thus, if the client device receives the voice command "text hello to Alice," the client device may transmit the text message "hello" to Alice's phone number.

Likewise, the voice command "invite X to a meeting at Y" (where X is, e.g., a name of a contact and Y is, e.g., a time) may be associated with a client device function that opens a calendar application on the client device and instructs the calendar application to send contact X an invitation for a meeting starting at time Y. Thus, if the client device receives the voice command "invite Alice to a meeting at 2 pm," the client device may transmit an invitation to Alice for a meeting that starts at 2:00 PM.

One way in which parameterized audio shortcuts can be defined on the user interface of the client device is by placing the client device in the audio shortcut definition mode discussed above. While in the audio shortcut definition mode, the user of the client device may be prompted to enter a parameterized audio command (e.g., "play song parameter X"). The client device may use speech recognition to determine that the phrase "parameter X" indicates that (i) the user is defining a parameterized audio command, and (ii) a parameter will be referred to as "parameter X." In other words, "parameter X" may be a placeholder for the name of a song.

Then, the client device may prompt the user to navigate the client device's user interface to define the client device function. If the user navigates to the client device's music player application and chooses to play a given song, the client device may extrapolate that "parameter X" refers to a song selection. Accordingly, the client device may create an audio shortcut that associates (i) the audio command "play" followed by a song title, with (ii) a client device function that instructs the client device to play out the audio file associated with the song title.

For instance, if a client device with this audio shortcut registered receives the audio command "play song Stairway to Freebird," the client device may automatically look up a song titled "Stairway to Freebird" in the client device's media library. If such a song exists, the client device may instruct its music player to play this song.

Analogous audio shortcuts may be defined for the audio commands "play album parameter X" (the client device function may play some or all of the songs on the album specified as parameter X), "play playlist parameter X" (the client device function may play some or all of the songs in the playlist specified as parameter X), and so on. Furthermore, the audio command may be defined as just "play parameter X," and the client device function may search the client device's media library for a song, album, artist, playlist, video, etc., that is specified as parameter X. If matching media is found, the client device may play out the media if it is stored on the client device, or stream the media if it is stored on a remote server. If multiple matching media are found, the client device may prompt the user to select from a list of the matches, and/or the client device may automatically play one of the matches (e.g., the closest match).

3. Distribution of Audio Shortcuts

Client device manufacturers may find it desirable to equip their client devices with options and configurations, such as audio shortcuts, that they believe will be useful to their user base. However, prior to commercial deployment of these client devices, it may be difficult for these manufacturers to determine which audio shortcuts might be most useful, or useful to a large number of users.

Therefore, an audio shortcut, or a representation of an audio shortcut, defined on a given client device can be uploaded to a server device for further processing, storage, and/or download by other client devices. The server device may use "crowd-sourcing" to distribute this audio shortcut to other client devices.

By crowd-sourcing the audio shortcuts, the manufacturers may be relieved from having to predict which audio shortcuts might become popular with users of client devices. Instead, one or more users may create audio shortcuts that they find useful. If a relatively large number of users (e.g., 10, 100, 1000, 1,000,000, etc.) or percentage of users (e.g., 1%, 5%, 10%, etc.) define the same audio shortcut, then this audio shortcut may be deemed "popular." Such popular audio shortcuts may be distributed to other client devices.

In some embodiments, the server device may track the number of times that the same audio shortcut is uploaded by different client devices. For example, an audio shortcut associating the voice command "turn on Wifi" with a sequence of keypresses that activate the Wifi radio function may be defined on more than one client device. The server device may maintain a running count of the number of these client devices that have uploaded the audio shortcut to the server device.

Once the server device determines that it has received the same audio shortcut from a threshold number of client devices, the server device may do one or more of the following: (i) make the audio shortcut available for download to other client devices, or (ii) push the audio shortcut to other client devices as a default option. The threshold may be virtually any number, e.g., 10, 100, 1000, 1,000,000, and so on.

Further, the server device may separately track the number of times that the same audio shortcut is uploaded by each model of client device. Different models of client devices (e.g., different models of cell phones) may have different functions and user interfaces. Thus, client device functions defined on one model of client device may not operate as expected on other models of client devices. For example, an audio shortcut that operates on cell phone models 1100 and 1110 of a given manufacturer may not operate in the desired fashion on cell phone model 1120 of the given manufacturer.

By separating the management of audio shortcuts by client device model, the server device can seek to ensure that downloaded audio shortcuts will operate properly. Thus, for an audio shortcut that turns on the Wifi radio of a cell phone, the server device may store one version of the audio shortcut for cell phone models 1100 and 1110 and a different version of the audio shortcut for cell phone model 1120.

Figure 4:
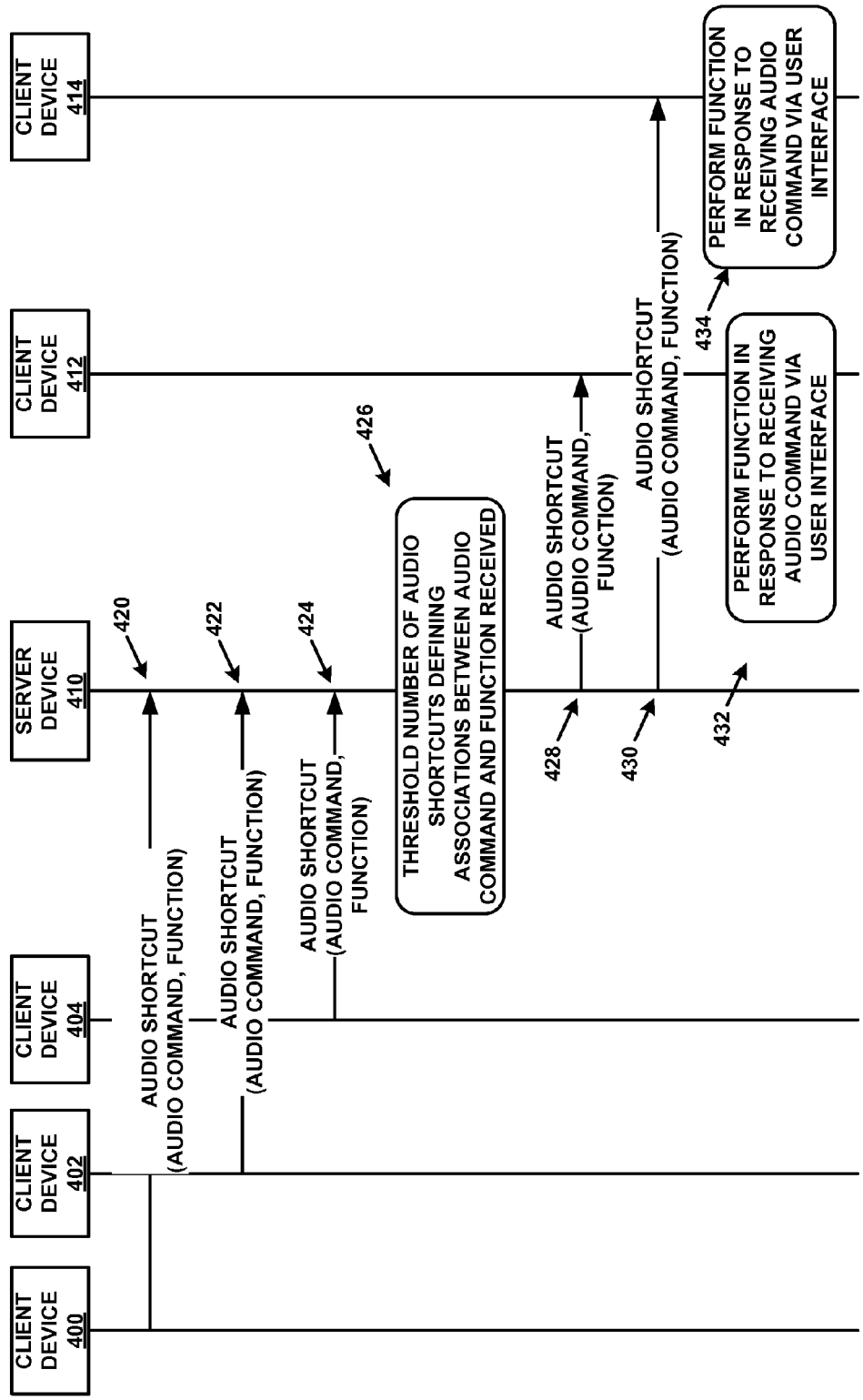
FIG. 4 is a message flow, in accordance with one or more example embodiments.
Figure 5:
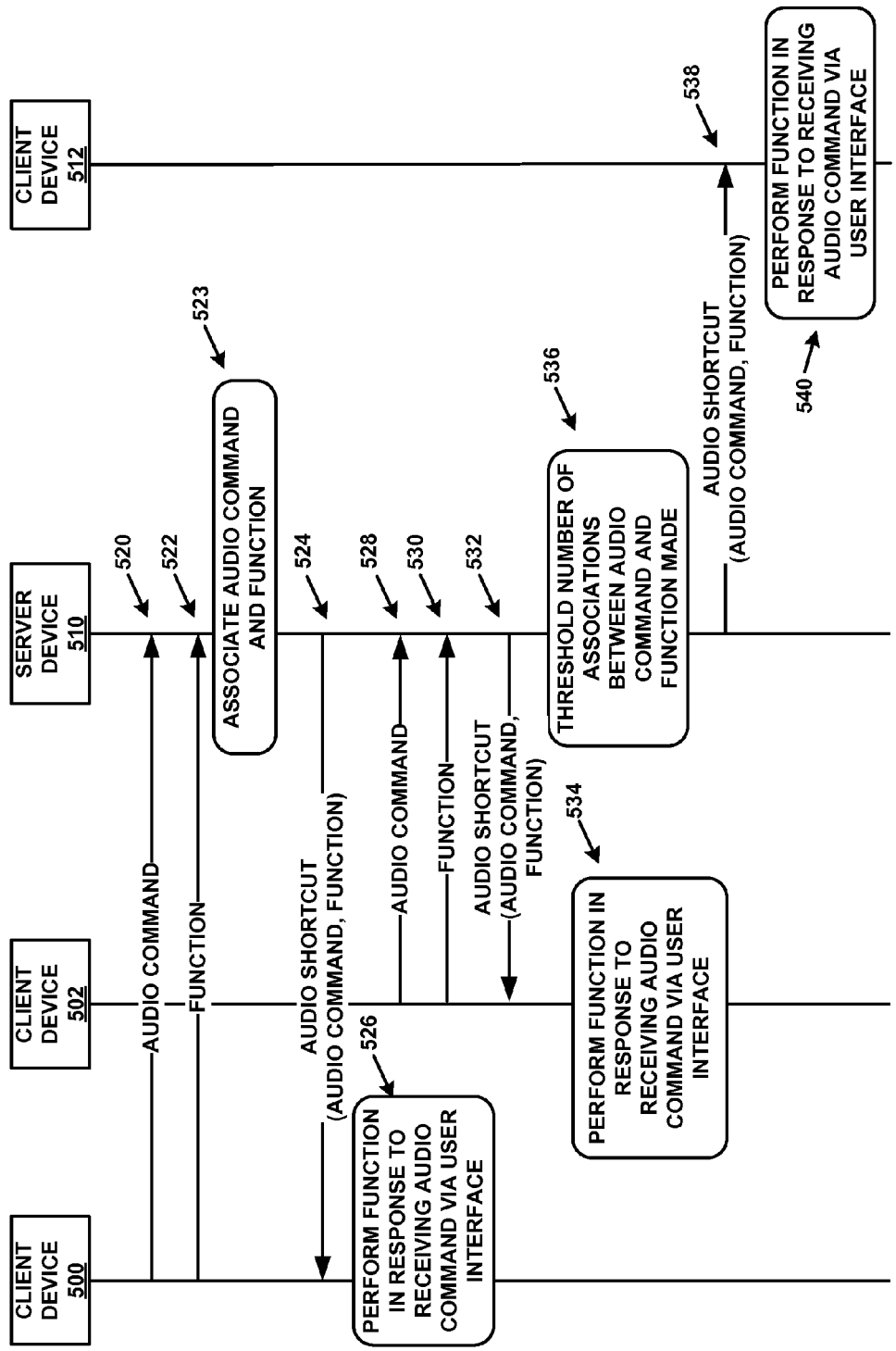
FIG. 5 is another message flow, in accordance with one or more example embodiments.
Figure 6:
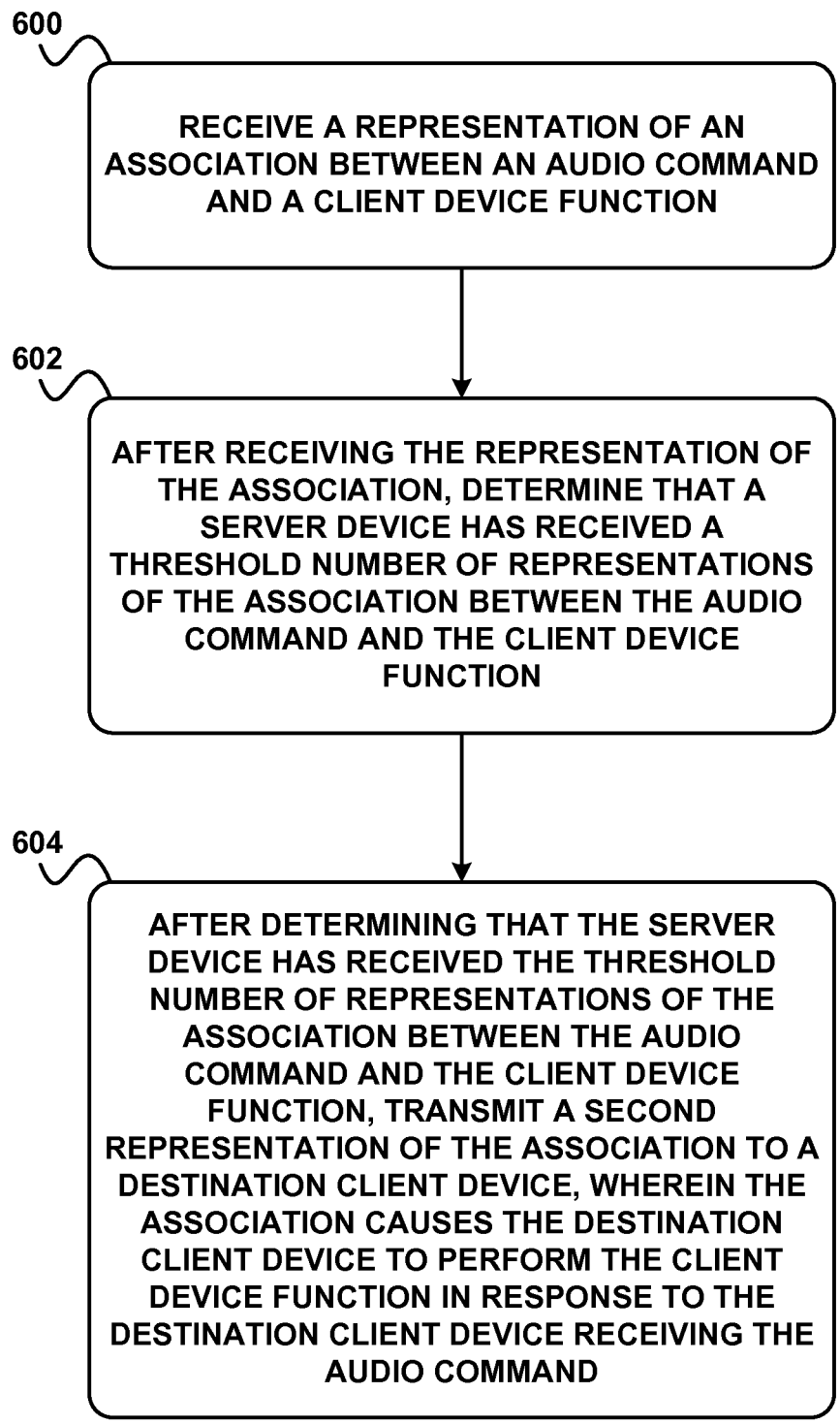
FIG. 6 is a flow chart, in accordance with one or more example embodiments.
Figure 7:
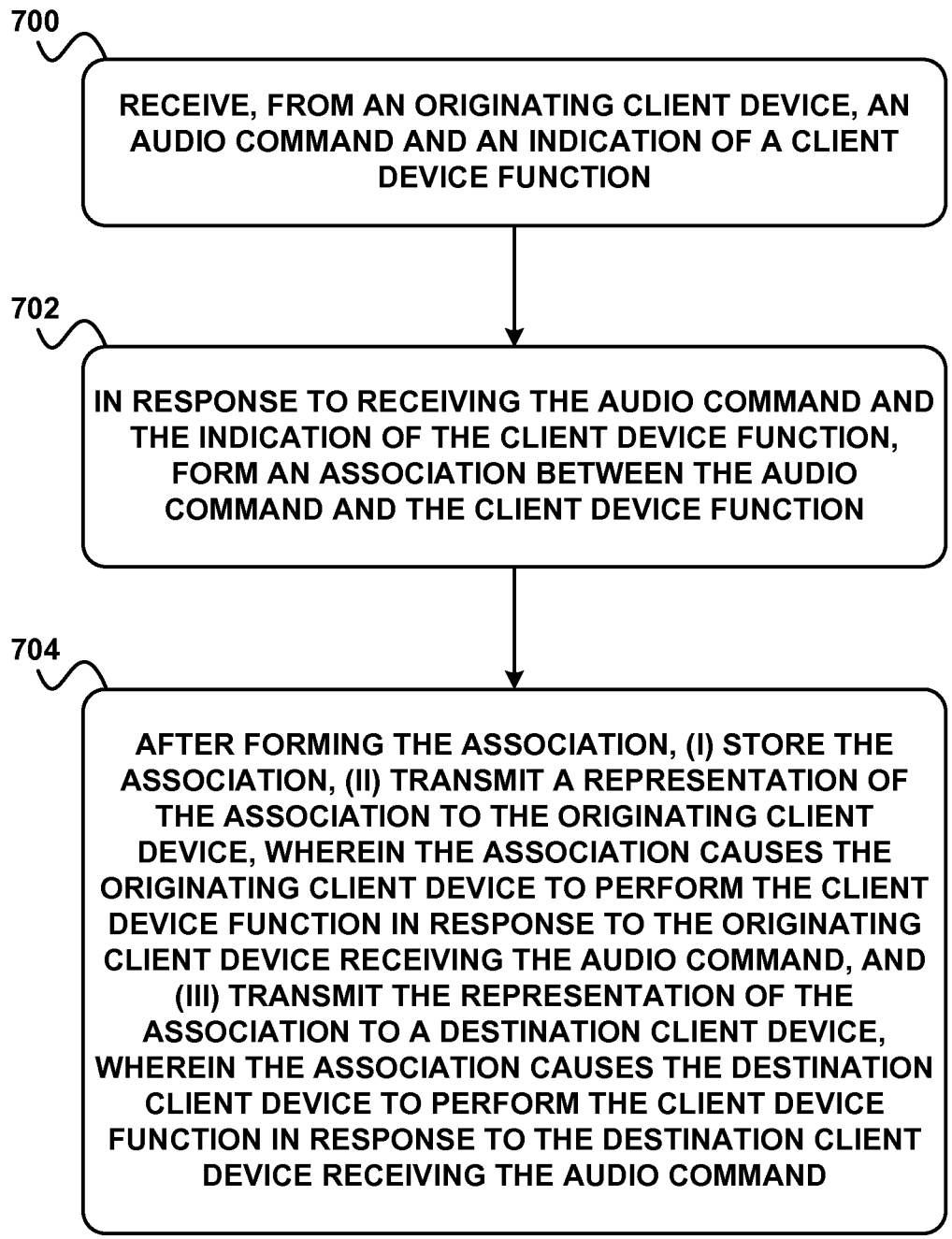
FIG. 7 is another flow chart, in accordance with one or more example embodiments.

The message flows of FIGS. 4 and 5, and the flow charts of FIGS. 6 and 7 further illustrate example embodiments for crowd-sourcing audio shortcuts. Particularly, in FIG. 4, a number of client devices (client devices 400, 402, 404, 412, and 414) are in communication with a server device 410. At step 420, client device 400 may transmit a representation of an audio shortcut to server device 410. This audio shortcut may be an association between (i) an audio command, and (ii) a function, such as a client device function. The audio shortcut may have been defined by a user of client device 400. Similarly, at step 422, client device 402 may transmit another representation of the audio shortcut to server device 410, and at step 424, client device 404 may transmit yet another representation of the audio shortcut to server device 410.

Thus, after step 424, server device 410 has received the same audio shortcut from at least three different client devices. In some cases, one or more of these audio shortcuts may represent their audio commands with an audio file, while others may represent their audio commands with a text string. In the latter case, the client device that sent the audio command may have performed voice recognition to convert the human speech in a voice command into a text string.

If two or more audio commands take the form of audio files, server device 410 may determine whether these audio files contain the same audio command through, e.g., matching the acoustic waveforms in the audio files. Alternatively, server device 410 may use voice recognition to convert the audio files to text strings, and then compare the resulting text strings to one another.

If some audio commands take the form of audio files and other audio commands take the form of text strings, server device 410 may use voice recognition to convert the audio files to texts strings so that only comparison of text strings needs to be performed. Thus, if client device 400 transmits an audio file audio command containing the phrase "turn on Wifi," and client device 402 transmits a text string audio command containing the text "turn on Wifi," server device 410 may classify both of the respective audio commands as the same.

As noted above, server device 410 may store a representation of the audio shortcut, and maintain a count of the number of client devices that have transmitted representations of the audio shortcut to server device 410, and/or the number of times that server device 410 has received a representation of the audio shortcut. At step 426, server device 410 may determine that it has received a threshold number of audio shortcuts defining associations between the audio command and the function. This threshold may be virtually any number. Further, the threshold may be pre-determined or set in server service 410, or may be dynamic. Such a dynamic threshold may change over time either manually or automatically.

Further, server device 410 may use "fuzzy matching" to match voice commands. Fuzzy matching can be used to match terms and phrases that otherwise would not be perfect matches. In some cases, a fuzzy matching technique may determine correlations between aspects of two or more phrases based on looking up one of the phrases in a database of previous matches to determine that other phrases are close.

For example, one user might associate the audio command "turn on Wifi" with activating a client device's Wifi interface, while another user might associate the audio command "turn Wifi on" with the same function. Since these audio commands are a near, though not exact, match, server device 410 may consider them to be the same voice command for purposes of counting the number of times an association was received, determining whether the threshold number of associations was received, and/or otherwise determining the popularity of an audio shortcut.

At step 428, possibly in response to making this determination, server device 410 may transmit a representation of the audio shortcut to client device 412. At step 430, also possibly in response to making the determination, server device 410 may transmit a representation of the audio shortcut to client device 414. At step 432, client device 412 may perform the function in response to receiving the audio command via the user interface of client device 412. Similarly, at step 434, client device 414 may perform the function in response to receiving the audio command via the user interface of client device 414.

In some embodiments, the user of a client device may interact with a server device to define an audio command and/or a client device function. For example, the server device might provide a web page prompting the user to either record an audio command, enter the text of an audio command, and/or to upload a pre-recorded audio command. The web page might also prompt the user to define a client device function and/or to upload a pre-defined client device function.

As an example of how a server device can facilitate the user's definition of a client device function, the server device may present the user with a representation of a client device user interface. This representation may be a graphical view of the user interface, and may allow the user to define a sequence of inputs (e.g., one or more keypresses, mouse actions, and/or touchscreen gestures). The user may define this sequence of inputs, for instance, by navigating the representation of the client device user interface presented on the web page.

There may be other ways in which a server device can allow an audio shortcut to be defined. For instance, the server device may display, via the web page, a list of client device functions, and may prompt the user to select one or more of these functions to associate with the audio command.

This server-based form of audio shortcut definition is illustrated by FIG. 5. In FIG. 5, a number of client devices, including client devices 500, 502, and 512, are in communication with a server device 510. At step 520, server device 510 may receive a representation of an audio command from client device 500. At step 522, server device 510 may receive a representation of a function (e.g., a client device function) from client device 500. At step 523, possibly in response to receiving the representation of audio command and the representation of the function, server device 510 may form an association (e.g., an audio shortcut) between the audio command and the function. Server device 510 may also increment a count of the number of associations made between the audio command and the function (not shown). At step 524, server device 510 may transmit this representation of the audio shortcut to client device 500. Then, at step 526, client device 500 may perform the function in response to receiving the audio command via the user interface of client device 500.

Similarly, at step 528, server device 510 may receive a representation of the audio command from client device 502. At step 530, server device 510 may receive a representation of the function from client device 502. Possibly in response to receiving a representation of the audio command and a representation of the function, server device 510 may again form an association between the audio command and the function, and increment the count of the number of associations made between the audio command and the function. At step 532, server device 510 may transmit a representation of the audio shortcut to client device 502. Then, at step 534, client device 502 may perform the function in response to receiving the audio command via the user interface of client device 502.

At step 536, possibly in response to receiving the representations of the audio command and function from client devices 500 and 502, server device 510 may determine that it has made a threshold number of associations between the audio command and the function. This threshold may be virtually any number. At step 538, possibly in response to making this determination, server device 510 may transmit a representation of the audio shortcut to client device 512. At step 540, client device 512 may perform the function in response to receiving the audio command via the user interface of client device 512.

FIG. 6 is a flow chart that illustrates an additional example embodiment. At step 600, a server device may receive a representation of an association between an audio command and a client device function.

The client device function may take on various forms. For example, the client device function may comprise a telephony function, a function controlling media playout on the destination client device, and/or a function controlling an application operating on the destination client device. The client device function may be represented as a sequence of one or more inputs on a client device user interface, one or more state changes on a client device, or in some other way. The server device may receive the representation of the association from an originating client device on which the audio command was associated with the client device function.

At step 602, after receiving the representation of the association, the server device may determine that the server device has received a threshold number of associations between the audio command and the client device function. At step 604, after determining that the server device has received the threshold number of representations of the association between the audio command and the client device function, the server device may transmit a second representation of the association to a destination client device. The association may cause the destination client device to perform the client device function in response to the destination client device receiving the audio command.

The server device may track the number of unique client devices from which representations of the association are received. Then, instead of or in addition to the determination of step 602 above, the server device may also determine that the server device has received the threshold number of representations of the association between the audio command and the client device function from unique client devices. Accordingly, the server device may condition performance of step 604 on this determination.

In some situations it may be beneficial for the server device to provide the representation of the association only to (or primarily to) other client devices in the same geographical region as the originating client device. For example, even amongst speakers of the same language, there may be regional dialects, phraseologies, or vernaculars. In some parts of the world, English speaking users may associate the audio command "call voicemail" with a client device function accessing the users' voicemail messages. However, in other parts of the world, English speaking users may associate the audio commands "ring voicemail," or "dial voicemail" with the same client device function.

In some cases, the originating client device and destination client device may be physically located in a given geographical region. The server device may transmit the second representation of the association to the destination client device based on (and/or conditioned on) at least the originating client device and the destination client device both being physically located in the given geographical region.

Alternatively or additionally, the destination client device may be one of a plurality of client devices, and each client device in the plurality of client devices may be physically located in the given geographical region. Then, in response to the server device determining that the server device has received the threshold number of representations of the association between the audio command and the client device function, the server device may make the association a default setting of the plurality of client devices. A default setting may be applied to a client device, for example, either manually, or via download of an updated configuration file or firmware to the client device.

In full generality, originating and destination client devices can be grouped on a basis other than geographic location. For example, groups of originating and destination client devices can be defined based on the language preference of the respective users of these client devices. Thus, some audio shortcuts can be crowd-sourced substantially separately for groups of client devices with users that speak English, French, German, and so on. These groups might be further subdivided into dialects of each language, such that some audio shortcuts can be crowd-sourced substantially separately for groups of client devices with users that speak American English, Canadian English, Australian English, etc.

Further, the audio command may be parameterized. For example, the audio command may comprise a given command and a given parameter. The client device function may also be parameterized, and the association may cause the destination client device to perform the client device function with the given parameter in response to the destination client device receiving the given command with the given parameter.

In some embodiments, manually performing the client device function on the destination client device may typically comprise manual entry of one or more inputs via a user interface of the destination client device. Thus, for example the destination client device may include a keypad (either a physical keypad or a virtual keypad on a presence-sensitive input component such as a touchscreen), and the one or more inputs of the client device function may comprise one or more inputs from the keypad. Alternatively or additionally, the one or more inputs may comprise one or more other types of inputs from the presence-sensitive input component.

FIG. 7 is a flow chart that illustrates an additional example embodiment. At step 700, a server device may receive, from an originating client device, an audio command and a client device function. The client device function may be represented as a sequence of one or more inputs on a client device user interface. At step 702, in response to receiving the audio command and the client device function, the server device may form an association between the audio command and the client device function.

At step 704, after forming the association, the server device may store the association. Further, the server device may transmit a representation of the association to the originating client device. The association may cause the originating client device to perform the client device function in response to the originating client device receiving the audio command. The server device may also transmit the representation of the association to a destination client device. The association may cause the destination client device to perform the client device function in response to the destination client device receiving the audio command.

In possible embodiments, the server device may conditionally transmit the representation of the association to the destination client device. For instance, this transmission may be performed in response to the server device determining that the server device has received a threshold number of representations of the association between the audio command and the client device function.

The originating client device and the destination client device of the flow chart of FIG. 7 may be physically located in a given geographical region. The server device may transmit the representation of the association to the destination client device based at least on the originating client device and the destination client device both being physically located in the given geographical region. Additionally, the server device may transmit the representation of the association to the destination client device based on the server device also receiving the audio command and the client device function from a second originating client device.

In either or both of the embodiments illustrated by FIGS. 6 and 7, and/or in other embodiments as well, a server device may comprise a processor, data storage and a communication interface. The data storage may contain at least part of an association database that includes representations of associations between audio commands and client device functions. The communication interface may be capable of communicating with a plurality of client devices.

The server device may receive, from a first client device in the plurality, a first representation of an association between a given audio command and a given client device function. Possibly in response to receiving the first representation of the association, the server device may update the association database to incorporate the first representation of the association. The server device may also receive, from a second client device in the plurality, a second representation of the association between the given audio command and the given client device function. Possibly in response to receiving the second representation of the association, the server device may update the association database to incorporate the second representation of the association. Based on the content of the association database, the server device may determine that the server device has received a threshold number of representations of the association between the given audio command and the given client device function. The server device may then transmit, to one or more client devices in the plurality, a third representation of the association between the given audio command and the given client device function.

With respect to any or all of the message flows and flow charts in the figures and as discussed herein, each step or block may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or message may be executed out of order from that shown or discussed, including substantially concurrent or in reverse order, depending on the functionality involved. Further, more or fewer steps, blocks and/or functions may be used with any of message flows and flow charts discussed herein, and these message flows and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data), and the program code may include one or more instructions executable by a processor for implementing specific logical functions or actions in the method or technique.

The program code and/or related data may be stored on any type of computer-readable medium such as a storage device including a disk or hard drive or other storage medium.

Moreover, a step or block that represents one or more information transmissions may correspond to information transmissions between software and/or hardware modules in the same physical device. However, other information transmissions may be between software modules and/or hardware modules in different physical devices.

4. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the claims.

We claim:

1. A method comprising:
   receiving, by a computing device and from a first user device, a representation of an association between an audio command and a user device function, wherein the user device function is represented as a sequence of one or more inputs on a user device user interface;
   after receiving the representation of the association, determining, by the computing device, that the computing device has received a threshold number of representations of the association between the audio command and the user device function, each representation from a different respective user device; and
   after determining that the computing device has received the threshold number of representations of the association between the audio command and the user device function, transmitting, by the computing device, a second representation of the association to a second user device, wherein the association causes the second user device to perform the user device function in response to the second user device receiving the audio command, wherein the second user device is different from the first user device and the second user device is not one of the respective user devices.

2. The method of claim 1, wherein the audio command was associated with the user device function on a user interface of the first user device.

3. The method of claim 1, wherein the first user device is physically located in a given geographical region, wherein the second user device is physically located in the given geographical region, and wherein the computing device transmits the second representation of the association to the second user device based at least on the first user device and the second user device both being physically located in the given geographical region.

4. The method of claim 1, wherein the first user device is physically located in a given geographical region, the method further comprising:
   in response to the computing device determining that the computing device has received the threshold number of representations of the association between the audio command and the user device function, the computing device making the association a default setting of the respective user devices, wherein each respective user device is physically located in the given geographical region.

5. The method of claim 1, wherein the audio command comprises a given command and a given parameter, wherein the user device function is parameterized, and wherein the association causes the second user device to perform the user device function with the given parameter after the second user device receives the given command with the given parameter.

6. The method of claim 1, wherein the user device function comprises a telephony function.

7. The method of claim 1, wherein the user device function comprises controlling media playout on the second user device.

8. The method of claim 1, wherein the user device function comprises controlling an application operating on the second user device.

9. The method of claim 1, wherein performing the user device function on the second user device typically comprises manual entry of one or more inputs via a user interface of the second user device.

10. The method of claim 9, wherein the second user device comprises a keypad, and wherein the one or more inputs comprise one or more inputs from the keypad.

11. The method of claim 9, wherein the second user device comprises a presence-sensitive input component, and wherein the one or more inputs comprise one or more inputs from the presence-sensitive input component.

12. An article of manufacture including a non-transitory computer-readable medium, having stored thereon program instructions that, if executed by a server device, cause the server device to perform operations comprising:
   receiving a representation of an association between an audio command and a client device function, wherein the client device function is represented as a sequence of one or more inputs on a client device user interface;
   after receiving the representation of the association, determining that the server device has received a threshold number of representations of the association between the audio command and the client device function; and
   after determining that the server device has received the threshold number of representations of the association between the audio command and the client device function, transmitting a second representation of the association to a destination client device, wherein the association causes the destination client device to perform the client device function in response to the destination client device receiving the audio command.

13. The article of manufacture of claim 12, wherein the server device receives the representation of the association from an originating client device.

14. The article of manufacture of claim 13, wherein the audio command was associated with the client device function on a user interface of the originating client device.

15. The article of manufacture of claim 13, wherein the originating client device is physically located in a given geographical region, wherein the destination client device is physically located in the given geographical region, and wherein the server device transmits the second representation of the association to the destination client device based at least on the originating client device and the destination client device both being physically located in the given geographical region.

16. The article of manufacture of claim 13, wherein the originating client device is physically located in a given geographical region, wherein the program instructions, if executed by the server device, cause the server device to perform operations further comprising:
   in response to the server device determining that the server device has received the threshold number of representations of the association between the audio command and the client device function, making the association a default setting of a plurality of client devices, wherein each client device in the plurality of client devices is physically located in the given geographical region, and wherein the destination client device is in the plurality of client devices.

17. The article of manufacture of claim 12, wherein the audio command comprises a given command and a given parameter, wherein the client device function is parameterized, and wherein the association causes the destination client device to perform the client device function with the given parameter after the destination client device receives the given command with the given parameter.

18. A server device comprising:
a processor;
data storage containing at least part of an association database, wherein the association database contains representations of associations between audio commands and client device functions; and
a communication interface capable of communicating with a plurality of client devices, wherein (i) the server device receives, from a first client device in the plurality, a first representation of an association between a given audio command and a given client device function, wherein the given client device function is represented as a sequence of one or more inputs on a client device user interface, (ii) in response to receiving the first representation of the association, the server device updates the association database to incorporate the first representation of the association, (iii) the server device receives, from a second client device in the plurality, a second representation of the association between the given audio command and the given client device function, (iv) in response to receiving the second representation of the association, the server device updates the association database to incorporate the second representation of the association, (v) based on content of the association database, server device determines that the server device has received a threshold number of representations of the association between the given audio command and the given client device function, and (vi) the server device transmits, to one or more client devices in the plurality, a third representation of the association between the given audio command and the given client device function.

19. The server device of claim 18, wherein the first and second client devices are physically located in a given geographical region, wherein the one or more client devices in the plurality are physically located in the given geographical region, and wherein the server device transmits the third representation of the association to the one or more client devices in the plurality based at least on the first client device, the second client device, and the one or more client devices in the plurality all being physically located in the given geographical region.

20. The server device of claim 18, wherein the first and second client devices are physically located in a given geographical region, wherein, in response to the server device determining that the server device has received the threshold number of representations of the association between the given audio command and the given client device function, the server device makes the association a default setting of the one or more client devices in the plurality, and wherein each of the one or more client devices in the plurality is physically located in the given geographical region.

\* \* \* \* \*